Figure 1:
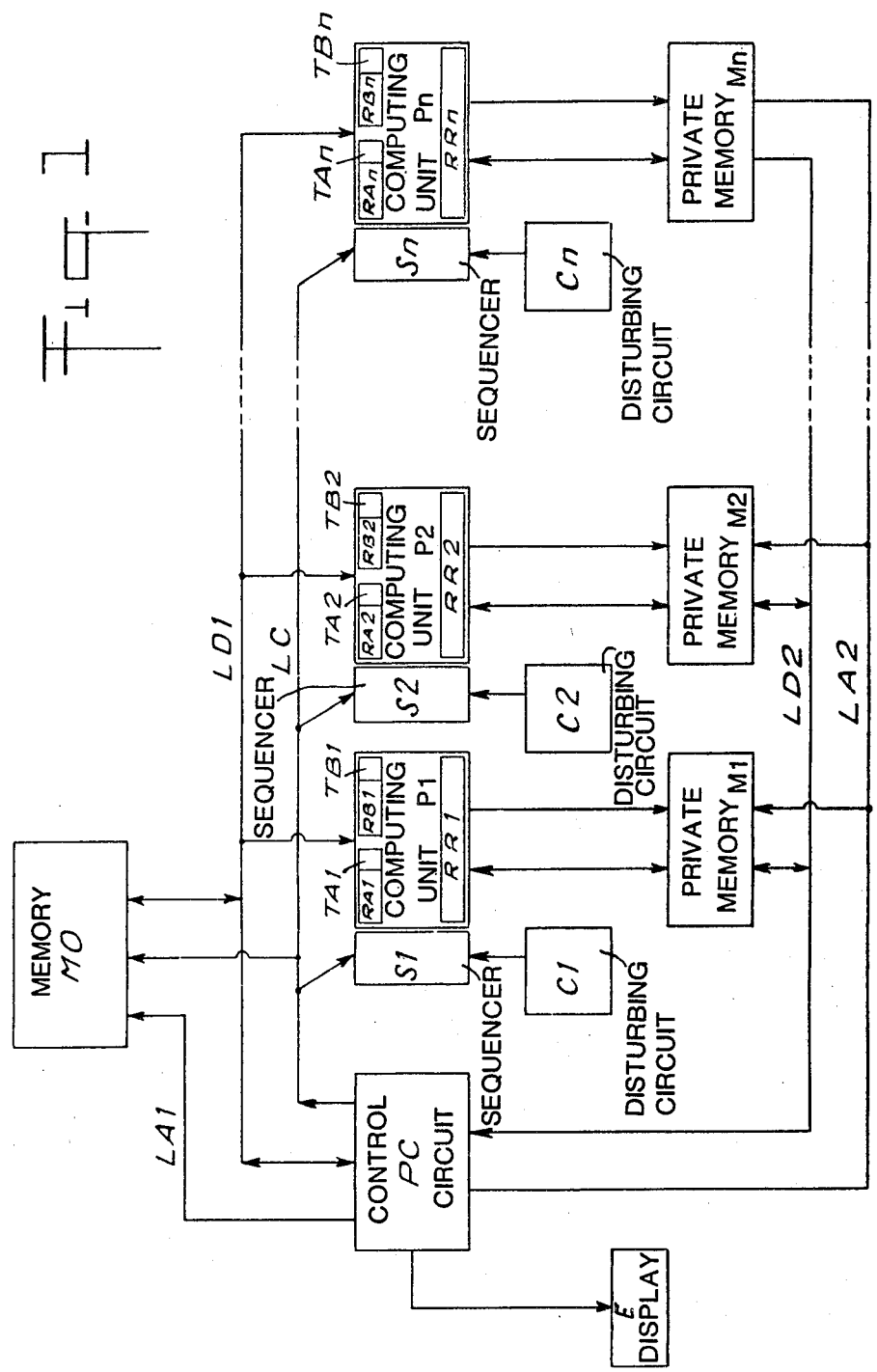

United States Patent [19]

Vignes et al.

[11] 4,367,536
[45] Jan. 4, 1983

[54] ARRANGEMENT FOR DETERMINING NUMBER OF EXACT SIGNIFICANT FIGURES IN CALCULATED RESULT

[75] Inventors: Jean P. Vignes, Rueil-Malmaison; Vincent Ung, La Varenne, both of France

[73] Assignee: Agence Nationale de Valorisation de la Recherche (A.N.V.A.R.), France

[21] Appl. No.: 114,586

[22] Filed: Jan. 23, 1980

[30] Foreign Application Priority Data

Feb. 2, 1979 [FR] France ............................. 79 02784

[51] Int. Cl.³ .............................................. G06F 7/38
[52] U.S. Cl. .................................................... 364/745
[58] Field of Search ................................. 364/745, 748

[56] References Cited

U.S. PATENT DOCUMENTS

| | | | |
|---|---|---|---|
| 3,569,685 | 3/1971 | Chesley | 364/745 |
| 3,699,326 | 10/1972 | Kindell et al. | 364/745 |
| 4,110,831 | 8/1978 | Langdon, Jr. | 364/745 |

OTHER PUBLICATIONS

Bright et al., "A Software System for Tracing Numerical Significance During Computer Program Execution" *Proceeding of the Spring Joint Computer Conference* A.S.I.P.S. Conference Proceeding, vol. 38, May 18-20, 1971, pp. 387-392.

Kuck et al., "Analysis of Rounding Methods in Floating-Point Arithmetic" *IEEE Trans. on Computers* vol. C-26, No. 7, Jul. 1977, pp. 643-650.

*Primary Examiner*—David H. Malzahn
*Attorney, Agent, or Firm*—Lewis H. Eslinger

[57] ABSTRACT

With every numerical data there is associated an item of truncation information (TA1, TB1, ...) which is true or false according to whether its value is or is not truncated in the representation employed, the calculation is carried out a number of times while disturbing the development of at least one procedure independently of the others, the disturbance consisting during the course of each elementary operation of adding on occasion and at random a bit of the lowest significance to the mantissa of each number the associated item of truncation information of which is positive, and the mean value and the standard deviation of the different results provided are worked out in order to determine the number of exact significant figures in one of these results.

10 Claims, 4 Drawing Figures

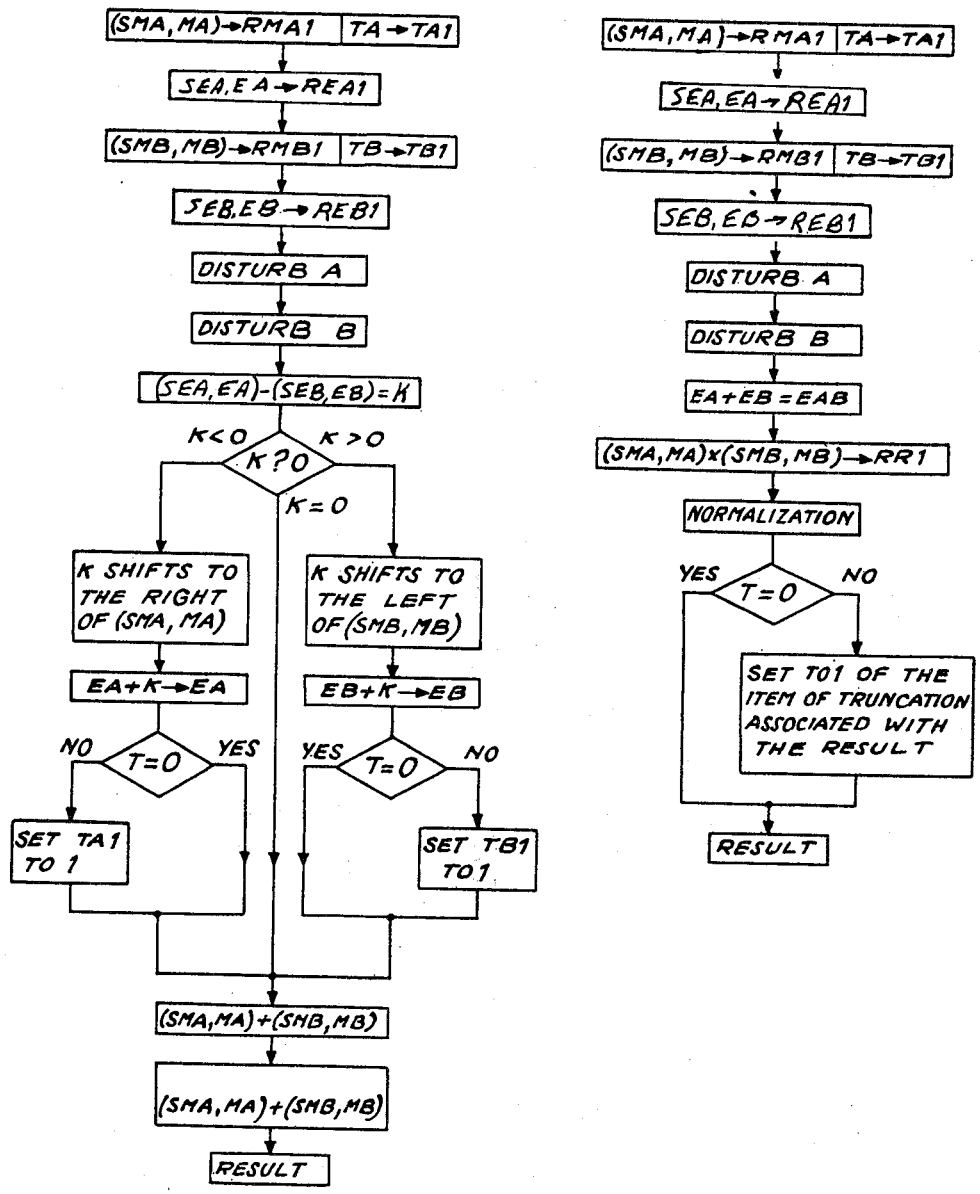

ARRANGEMENT FOR DETERMINING NUMBER OF EXACT SIGNIFICANT FIGURES IN CALCULATED RESULT

The present invention relates to a method of calculation enabling results of calculation to be provided with the number of exact significant figures in these results. The present invention also relates to a computer assembly having the same object.

The field of application of the invention is that of digital computers working upon members represented as having a floating point with mantissa and exponent.

The representation of a number in a computer is effected by means of a finite number of significant figures, which necessarily brings about a loss of accuracy. Digital computers work in arithmetic with truncation or with rounding off. In truncation the values of the numbers employed are always values with a deficiency. In rounding off, the values employed are values approximated from below or from above. In any case the accuracy of the result is vitiated.

In order to evaluate the error in the result of an algorithm one may conceive of estimating for each elementary arithmetical operation an upper bound on the average value of the error. However, this cannot be employed in practice. That is, if each time the upper bound of the error is taken for the elementary operations of the algorithm, the estimated value of the error in the final result is much greater than its real value. Furthermore, the average estimation of the error can be considered only if the errors are independent for the different elementary operations, which in practice is never the case in algorithms.

So the aim of the present invention is to provide a method from which the number of exact significant figures may be determined in a result from a calculation carried out by means of a digital computer according to a procedure including one or more elementary operations carried out upon numbers of which the representation employed is that having a floating point with mantissa and exponent.

This end is attained by a method according to which, in accordance with the invention:

with every piece of digital data there is associated an item of truncation information which is true or false according to whether the real value of this piece of data is or is not truncated in the representation employed for this piece of data;

the said procedure is carried out a number of times whilst disturbing the development of at least one of the procedures independently of the others, an item of truncation information being associated with each result of elementary operation and the said disturbance consisting during the course of each elementary operation of adding on occasion and at random a bit of the lowest significance to the mantissa of each number the associated item of truncation information of which is positive; and the mean value and the standard deviation of the results provided by the different steps of the procedure are worked out in order to determine the number of exact significant figures in one of these results.

Any arithmetical value has two machine representations: approximated one from above, the other from below. In any arithmetical operation bringing into play two or more operands, all of the random combinations of the values of the operands approximated from below or from above provide results all of which represent with equal validity the exact mathematical result.

With the method in accordance with the invention a set of results are obtained from which can be worked out the mean value and the variance in order to estimate the error in one of them.

A set of results may be obtained in parallel in different computing units. One may also envisage effecting a number of independent successive computations of the procedure in one and the same computing unit.

It is in general sufficient to have available three results. They may be produced by disturbing the development of the procedure every time. By way of a variant, one result may be worked out by working systematically with values rounded off from above, another result by working with values off from below, the third result at least being obtained by random disturbance.

In order to avoid an excess of disturbances which would result in a too greatly vitiated value, the item of truncation information associated with a number is brought back to the false state after this number has been disturbed, whether or not this disturbance be expressed by the addition of a bit of the lowest significance to the mantissa of the number.

The item of truncation information is brought up-to-date after each operation, the result of which is a truncated number.

In the case, for example, of an addition, if one of the operands is truncated it is disturbed in the computing unit and the associated item of truncation information is brought back to the false state in the computing unit. Then the item of truncation information associated with an operand is brought back to the true state in the computing unit if during the course of denormalization of this operand at least one of the bits shifted to the right and lost is not zero. Then a true item of truncation information is associated with the result or the latter is disturbed directly if the item of truncation information associated with one of the denormalized numbers is true in the computing unit.

In the case of a multiplication (or division), the result is placed in a double-length register and a true item of truncation information is associated with the normalized result if at least one bit is not zero amongst those of the extended register which are suppressed on the right at the time of normalization.

More generally the item of truncation information is made to change to the true state if an item of information which is not zero is lost at the time of a reduction in format.

The invention also has the aim of providing a computer assembly which puts into effect the method defined above.

This end is attained by a computer assembly which includes a memory in which is recorded a procedure comprising one or more elementary operations, at least one computing unit connected to the memory and comprising at least one data register and one result register and one control unit to control the performance of said procedure, the computer assembly including in addition in accordance with the invention a supplementary binary position associated with each data register for storing an item of truncation information having a first or a second state according to whether the digital value of the data recorded in the register is or is not truncated in the representation of this data appearing in the said register, a random signals generator associated with the computing unit, a disturbance circuit interposed between the random signals generator and the computing unit in order to add or not to add in a random fashion to each number introduced into a data register a bit of the lowest significance when the item of truncation information associated with this number is true, means of recording results produced by several different carryings out of said procedure and means of calculating the mean value and the standard deviation of the results in order to determine the number of significant figures in one of them.

In accordance with one special feature of the computer assembly in accordance with the invention there are included a number of computing units operating in parallel, having elementary control sequences connected to one common general control unit and associated with respective distinct random-signals generators operating independently of one another.

In accordance with another special feature of the computer assembly in accordance with the invention there are included a circuit for working out of truncation information, connected to the result register in order to associate an item of truncation information with each result of elementary operation.

Figure 2:
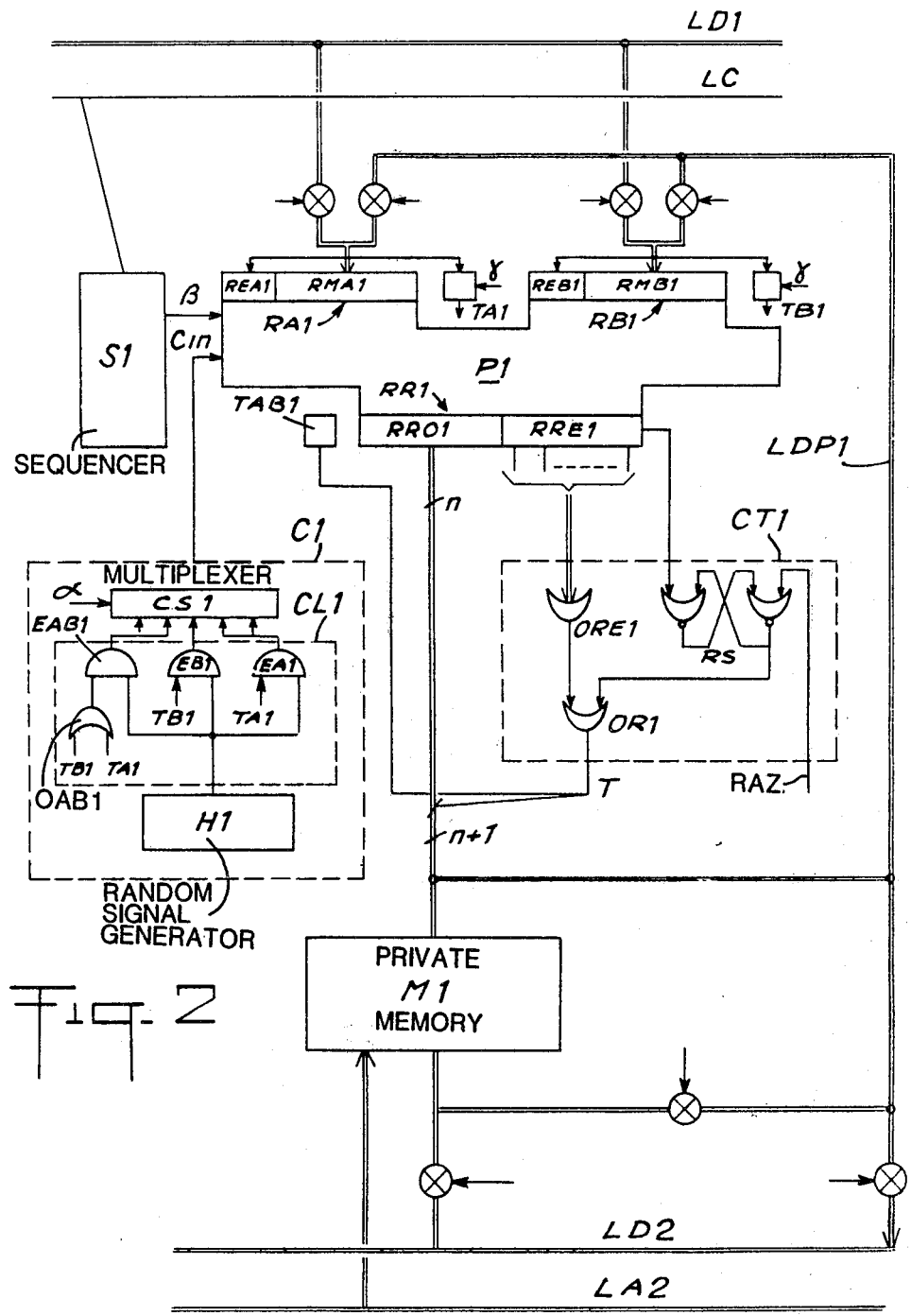

Other special features and advantages of the method and of the computer assembly in accordance with the invention will become apparent from reading the description given below by way of indication but non-restrictively, by reference to the Figures of the attached drawings which illustrate:

FIG. 1—a diagrammatic representation of a computer assembly in accordance with the invention;

FIG. 2—a more detailed diagram of a computer unit of the computer assembly illustrated in FIG. 1; and FIGS. 3 and 4—sequencer charts relative to the development of arithmetical operations in the computer assembly as FIG. 1.

In the floating-point representation of numbers, such numbers comprise a mantissa and an exponent. The mantissa includes n positions, n being a number depending upon the format employed in the digital computer.

When this number n is insufficient for the exact representation of a number the latter is truncated in the representation which is employed as is in the digital computer. The operations carried out upon the truncated numbers give inexact results and even sometimes aberrant ones.

In accordance with the invention one and the same procedure is carried out a number of times whilst disturbing its development every time and independently for all of the computations of this procedure. This disturbance consists for each piece of truncated data in taking in a random manner its value with a deficiency or its value with an excess by adding at random a 0 or a 1 to the least significant bit of the mantissa.

For this purpose there is associated with each piece of digital data an item of truncation information which consists in the state of a supplementary binary position in the representation of the number as having a decimal point. This new representation of a number is one of the characteristics of the invention. It is represented schematically as follows:

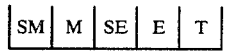

where
SM represents the sign of the mantissa,
M, the mantissa,
SE, the sign of the exponent,
E, the exponent, and
T, the truncation bit.

This mode of representation holds both as a mode which is a complement to one and as a mode which is a complement to two. In the latter case the truncation bit is associated with the pair (SM,M) which is a representation as a complement to two of the mantissa, and to the pair (SE,E) which is a representation as a complement to two of the exponent.

The exponent and its associated sign may be replaced by the conventional technique of the biased exponent.

It will be assumed in what follows that the truncation bit is 0 when the number is not truncated, and 1 when the number is truncated. Inverted convention may be used instead, however.

The method in accordance with the invention may be put into effect by means of the computer assembly represented in FIGS. 1 and 2.

A memory MO contains a procedure to be carried out, the procedure consisting of a sequence of algebraic operations to be performed.

The memory MO is interconnected with computing units P1, P2 ... Pn by way of a connection LD1 forming a data bus. Each computing unit consists of an operator known in itself and carrying out simple arithmetical operations. Two data registers RA1–RB1, RA2–RB2, ... RAn–RBn, are associated with each unit P1, P2, ... Pn, as well as one result register, respectively RR1, RR2, ... RRn. Each result register is connected to a private memory, respectively M1, M2, ... Mn associated with each computing unit. The outputs from the private memories are interconnected by a data bus LD2.

Each computing unit P1, P2, ... Pn includes an elementary control member or elementary sequencer S1, S2, ... Sn which is integrated with the computing unit. The sequencers are represented outside the computing unit in FIGS. 1 and 2 solely for clarity in the drawing.

In accordance with the invention a supplementary binary position TA1, TB1, TA2, TB2 ... TAn, TBn is united with each data register RA1, RB1, RA2, RB2, ... RAn, Rbn. In this supplementary binary position which may be embodied, for example, as a flip-flop, is placed the truncation bit T associated with the number which is introduced into the corresponding data register.

Each result register (for example, the register RR1 of the operator P1—FIG. 2) is as known in itself a double-length register, that is to say, including a first portion RRO1 of normal format and an extended register RRE1 of the same format.

In accordance with the invention a circuit CT1 for working out truncation information is associated with the result register RR1.

The circuit CT1 includes an "OR" circuit ORE1 the inputs to which receive the different bits from the extended register RRE1, and a flip-flop B1 of RS type one input to which is connected to the series output from the extended register RRE1. The second input to the flip-flop B1 is connected to a zero reset control RAZ. The outputs from the circuits ORE1 and RS are connected to an "OR" circuit OR1 the output from which forms the output from the circuit CT1. Thus the latter enables the loss of an item of information to be detected at the time of a shifting to the right of the extended register or if this item of information located in the extended register is not taken into account.

The output information from the circuit CT1 is united with the contents of the first portion RRO1 of the result register in order to form the truncation bit associated with the result of an operation carried out by the input P1. This truncation bit may be employed immediately as will be seen later for controlling the disturbance of the result. This result with its associated truncation bit is available on the data bus LD2 and may be stored in the private memory M1. This same result may also be brought back through a data line LDP1 in one of the registers RA1 or RB1, the item of truncation information associated with this result then being placed in TA1 or TB1. The output from the private memory M1 is also connected to the line LDP1.

A control unit PC is interconnected with the data buses LD1, LD2 and is connected to th common memory MO and to the sequencers S1, S2, . . . Sn by a connection LC forming a control bus. Connections LA1 and LA2 forming address buses connect the control unit PC to the common memory MO and the private memories M1, M2, . . . Mn respectively.

A disturbance circuit C1, C2, . . . Cn is associated with each unit P1, P2, . . . Pn, respectively. Each circuit C1, C2, . . . Cn includes a random signals generator H1, H2, . . . Hn consisting, for example, of a conventional noise amplifier. The several random signals generators associated with the computing units operate independently of one another.

Each disturbance circuit C1, C2, . . . Cn includes in addition a logic circuit interposed between the random signals generator H1, H2, . . . Hn and a multiplexer CS1 forming the output circuit from the disturbance circuit.

Each logic circuit (for example, the one CL1 of the circuit C1 associated with the unit P1—FIG. 2) includes three two-input "AND" gates EA1, EB1 and EAB1. One input to each of these gates receives the output signal from the generator H1. The other inputs to the gates, EA1, EB1 and EAB1 receive respectively the binary information contained in TA1, the binary information contained in TB1 and the output from the "OR" circuit OAB1, the inputs to which receive the binary information contained in TA1 and TB1.

Thus the output signal from the generator H1 is applied to the multiplexer circuit at multiple inputs CS1 when one of the following conditions is realized: (1) the item of truncation information associated with the number recorded in RA1 is true, (2) the item of truncation information associated with the number recorded in RB1 is true, and (3) the item of truncation information associated with at least any one of the numbers recorded in RA1 and RB1 is true. The circuit CS1 selector EA1 for the condition (1), EB1 for the condition (2), and EAB1 for the condition (3).

Means are provided, for example, at the level of the control sequencer for restoring to zero the truncation bit associated with a number when the latter has been disturbed.

As will be seen later, the control unit PC may contain a microprogramme which serves for the calculation of the mean value and the standard deviation carried out upon the final results supplied by the various computing units.

The developments of the procedures, the disturbances, the bringing up-to-date of the truncaton bits and the determination of the number of exact significant figures in a final result will be described in greater detail below.

The control of the computing unit is carried out at two levels.

At the first level the control unit PC, common to all of the computer units, interprets the procedure in the common memory MO. The control unit PC brings the same data at the same time to all of the computer units and commands the calculation. A subsequent task is ordered by the unit PC when it has received from all of the computing units the confirmation that they have finished the preceding task.

At the second level an elementary control sequencer S1, S2, . . . Sn is associated with each computing unit P1, P2, . . . Pn in order to manage the elementary operations such as: denormalization, disturbance, normalization and management of the truncation flip-flops TA1, TB1, TA2, TB2, . . . TAn, TBn.

Realization of the controls at the second level is a technique well known to those skilled in the art, working upon microprogrammed techniques. So one will merely describe below the controls at the second level specific to the invention through one of the computing units, for example, the computing unit P1.

These controls proceed from a read only memory or from an array having a programmable logic. The controls are produced by a number of successive fields $\alpha$, $\beta$, $\gamma$, . . . read out from the memory or arry. They may also be generated by a microprocessor or going to the extreme, each computer unit P1, P2, . . . Pn with its control member may be a microprocessor which receives its random clock.

One may consider, for example, the operation of disturbance of the piece of data A introduced into the register A1 (as likewise into the registers A2, . . . An) under the control of the unit PC.

The field $\alpha$ of the sequencer generates a code for selection of the information TA1×H1, the state of the clock H1 being random.

The field $\beta$ generates a code for operation A+Cin1, Cin1 representing the state TA1×H1 and being applied to the report input. If TA1=1 and H1=1, then Cin1=1. If TA1=1 and H1=0, then Cin1=0.

The transfer field controls the arraying of the random result A+Cin1 in a register, for example, RA1.

The field $\gamma$ generates a command for the resetting to zero of the flip-flop TA1 associated with the register RA1 containing the result A+Cin1.

The operation of disturbance of the piece of data A is then finished. The other fields of the sequencer then generate conventional commands according to the operation to be carried out upon the piece of data A.

The compounds are supplied at the first level by the control unit PC.

By way of example, algebraic operations are described below, of addition and of multiplication of two numbers A and B; the operations are effected by sequences of elementary operations controlled simultaneously in the several computing units. Solely the computing unit P1 is considered below.

For the operation of addition of A and B reference will be made to the sequencer chart as FIG. 3.

The number A is represented by the sign of its mantissa and its mantissa SMA, MA, by the sign of its exponent and its exponent SEA, EA and the truncation bit TA. Similarly the number B is represented by SMB, MB, SEB, EB and TB.

The following operations are carried out under the control of the unit PC:

SMA, MA are loaded into a portion RMA1 of the register RA1 and TA is loaded into TA1;

SEA, EA are loaded into a portion REA1 of the register RA1;

SMB, MB are loaded into a portion RMB1 of the register RB1, and TB is loaded into TB1; and SEB, EB are loaded into a portion REB1 of the register RB1;

If A is truncated: disturbance of A, loading of A-disturbed into RA1 and resetting to zero of TA1, are carried out;

if B is truncated: disturbance of B, loading of B-disturbed into RB1 and resetting to zero of TB1, are carried out;

K=(SEA, EA)−(SEB, EB) is calculated and K is compared with O:

if K>0, (SMB, MB) is shifted to the right K places (denormalization of B), EB+K is loaded into REB1 and TB1 is set to "1" if T=1 at the output from RRE1, if K<0, (SMA, MA) is shifted to the right K places (denormalization of A), EA+K is loaded into REA1, and TA1 is set to 1 if T=1 at the output from RRE1, (SMA, MA)+(SMB, MB) is calculated, (SMA, MA)+(SMB, MB) is disturbed if TA1 or TB1=1, and the result is loaded into a selected register.

It will be observed that at the end of each elementary operation each computing unit produces an end-of-operation signal. The next elementary operation is ordered only when all of the end-of-operation signals are present. That is, taking the disturbances into account, certain elementary operations (shiftings, for example) may be effected in different lengths of time in the several computing units.

The sequencer chart in FIG. 4 refers to the multiplication of the numbers A and B. As far as the phases of possible disturbances of A and B, this program is the same as that as illustrated in FIG. 3. After that the following elementary operations are carried out:

calculation of EA+EB=exponent E AB of the result is carried out, the product (SMA, MA) (SMB, MB) is calculated, the result at double length (SM AB, M AB) being available in RR1, this result is normalized, T is compared with 0 and the item of truncation information associated with the result is set to "1" if T=1 (for this purpose a supplementary binary position TAB1 may be associated with the result register, being constituted by a flip flop connected to the output from the circuit CT1).

If that proves necessary, taking into account the procedure recorded in the common memory MO, each result of algebraic operation may be employed as data for a following operation. It will be observed in this connection that the disturbance of the result is then carried out after its loading into a data register in the event of its not having been done after the working out of the truncation bit associated with this result.

When the definite results R1, R2, ... Rn of the procedures carried out in the several computer units are available, one proceeds to the calculation of the number of exact significant figures in any one of these results, for example, the result R1.

In order to do this the control unit PC has carried out by means of one of the control units (for example, P1) the following operations:

calculation of the average value $R=(R1+R2+ \ldots Rn)/N$, N being the number of results, calculation of the variance $\delta^2$ ($\delta$ being the standard deviation), calculation of the average error, estimated according to the formula:

$$\hat{\epsilon} = \sqrt{(R1 - \bar{R})^2 + \delta^2}$$

or any other suitable formula for statistical evaluation, calculation of the number C such that $b^{-C}=\hat{\epsilon}/R1$, C being the number of exact significant figures in R1 and b being the base of numeration (b=10 for the decimal calculation and b=2 for the binary calculation).

After working out C, a result R may be displayed as having a floating point representation, with only the number C of exact significant figures.

It is generally sufficient to have available three results. The number N of different computing units with their associated members may hence be limited to three.

As inciated above, one of the results may be obtained by working upon values rounded off systematically from below and another by working upon values rounded off from above, whilst of course at least a third result is worked out by working with random disturbance.

Furthermore a test of stability of the value of C may be carried out by calculating it upon the basis of two results and by comparing this calculated value with that worked out upon the basis of three results. If the deviation between these two calculated values shows instability, at least one new result is calculated, following use of a random disturbance independent of the preceding operation, until the calculated value of C is stationary.

Of course various modifications or additions may be applied to the embodiments described above of a method and of a computer assembly in accordance with the invention without thereby departing from the scope of protection defined by the attached claims. Thus the computer unit or units might work as known in itself with double accuracy.

We claim:

1. A method of determining the number of exact significant figures in a result of a calculation including elementary arithmetical operations performed in a digital computer using a floating point representation to represent digital data, the floating point representation having for each piece of digital data a mantissa and an exponent, the method comprising the steps of:

associating with each piece of digital data an item of truncation information having a value of "true" or "false" depending upon whether the piece of digital data is truncated or is not truncated, respectively, in the representation employed in calculating;

carrying out a plurality of independent calculations of said result, while disturbing each of such calculations independently of the other ones, an item of truncation operation being associated with each result of elementary arithmetical operation, and said disturbing of a calculation consisting of adding a random bit of lowest significance to the mantissa of each piece of digital data to be arithmetically operated upon when the item of truncation information associated therewith has a value of "true";

calculating the mean value and standard deviation of the plurality of independent results of calculations arrived at in said step of carrying out a plurality of independent calculations; and determining, from said mean value and said standard deviation, the number of exact significant figures in one of said results of calculations.

2. A method as claimed in claim 1 wherein after adding a random bit of lowest significance to the mantissa of one said piece of digital data, the item of truncation information associated therewith is changed to have a value of "false."

3. A method as claimed in claim 2 and further comprising denormalizing of one said piece of data whose mantissa comprises binary bits stored in a register, by shifting said bits in the direction of less significance so that the least significant bits are lost; and wherein the item of truncation information associated with said denormalized piece of data is changed to have a value of "true" if one of the lost bits is non-zero.

4. A method as claimed in claim 3, wherein one of said arithmetical operations comprises adding two pieces of digital data, and further comprising changing the item of truncation information associated with the sum thereof to have a value of "true," if a denormalized one of said pieces of digital data to be added has an item of truncation information having a value of "true."

5. A method as claimed in claim 1, wherein the format of one said piece of digital data is reduced by suppressing at least one of the least significant bits of the mantissa thereof, and further comprising changing the item of truncation information associated therewith to have a value of "true" if one of the suppressed bits is non-zero.

6. A method as claimed in claim 1, wherein said calculations are performed in parallel in a plurality of independent and substantially identical computing means.

7. A method as claimed in claim 1, wherein said calculation is carried out at least three times.

8. Computer apparatus for determining the number of exact significant figures in a result of a calculation including arithmetic operations performed upon numbers expressed in a floating point representation to represent digital data, the floating point representation having for each piece of digital data a mantissa and an exponent, the apparatus comprising:

(a) memory means for storing a procedure comprising said arithmetic operations, (b) at least one computing means connected to said memory means and including at least: one data register, one result register, and means for storing a supplementary binary indication associated with each data register, the indication having a first or a second state according to whether the digital value of the data stored in the data register is or is not truncated, respectively, in the representation of the data appearing in such register, (c) at least one random signals generator connected to said at least one computing means to provide thereto at least one random bit, and including a disturbance circuit interposed between the random signals generator and the computing means in order to add and not to add, as randomly determined, a bit of lowest significant to each number introduced into said data register when the supplementary binary indication associated therewith is of said first state, (d) at least one main control unit connected to said memory means and said at least one computing means to control the execution of said procedure in said computing means, (e) means connected to said at least one computing means for storing results of a plurality of executions of said procedure carried out independently of each other, and (f) means connected to said at least one computing means and to said results-storing means for calculating the mean value and standard deviation of said results and determining from such mean value and standard deviation the number of significant digits in one of said results.

9. Computer apparatus as claimed in claim 8, wherein a plurality of parallel computing means are each connected to a respective random signals generator, the random signals generators operating independently of one another, and said main control unit being common to all said computing means.

10. Computer apparatus as claimed in claim 8, further comprising circuit means coupled to said result register for determining truncation information and for associating wth each result of arithmetic operation calculated in said at least one computing means an item of truncation information to be supplied to said means for storing a supplementary binary indication.

* * * * *